UNITED STATES PATENT OFFICE.

ARTHUR ARENT, OF DES MOINES, AND RUDOLPH A. KUEVER, OF IOWA CITY, IOWA, ASSIGNORS, BY DIRECT AND MESNE ASSIGNMENTS, TO ARENTOX COMPANY, OF CHICAGO, ILLINOIS, A CORPORATION OF DELAWARE.

ART OF PROTECTING AND FIREPROOFING MATERIALS.

1,318,524.     Specification of Letters Patent.     Patented Oct. 14, 1919.

No Drawing.     Application filed September 29, 1917. Serial No. 193,975.

*To all whom it may concern:*

Be it known that we, ARTHUR ARENT and RUDOLPH A. KUEVER, citizens of the United States, residing at Des Moines, in the county of Polk and State of Iowa, and Iowa City, in the county of Johnson and State of Iowa, respectively, have invented certain new and useful Improvements in the Art of Protecting and Fireproofing Materials; and we do hereby declare the following to be a full, clear, and exact description of the invention, such as will enable others skilled in the art to which it appertains to make and use the same.

This invention relates to the art of protecting and fireproofing materials; and it is concerned more particularly with fireproofing solutions useful for treating normally combustible materials, such as wood, cloth, etc., to render them uninflammable or to reduce their combustibility, and to otherwise protect them.

The type of fireproofing solution hereinafter described and claimed is disclosed in our copending application, Serial No. 94245, filed April 28, 1916, of which the present application is a continuation in part.

Broadly speaking the present invention comprises the preparation of a novel treating solution, ordinarily aqueous, containing a relatively high percentage of zinc in such condition that, upon evaporation, the zinc content is deposited largely as zinc oxid, usually mixed with variable proportions of an oxysalt or basic salt of zinc, both the oxid and the basic salt being substantially water-insoluble and non-hygroscopic in character. Treating solutions contemplated herein should contain several per cent. of combined zinc by weight, most desirably five per cent. or more; and the residue from evaporation should contain substantially no non-volatile matter other than zinc oxid or basic salts of zinc. The power to penetrate and permeate freely wood or other materials to be treated is also an essential property of solutions within the invention. It is to be noted especially that materials may be fireproofed with our solution by a simple one-step impregnation or other suitable manner of application, as opposed to former methods involving impregnation followed by a second and separate step of treatment with a zinc precipitant.

In the best form of the invention at present known to us, the treating solution is aqueous and is characterized by an alkaline reaction. This is in contradistinction to the ordinary aqueous treating solution of zinc chlorid, for example, which is somewhat acid in reaction, due to the fact that it is a salt of a strong acid and a weak base. Furthermore, in our treating solution as employed in practice, the zinc is most desirably present, at least in part, as a compound resulting from reaction between zinc chlorid and ammonium hydroxid. This compound acts like, and probably is, an ammonium zincate. It is rather readily decomposed either upon spontaneous evaporation or upon moderate heating, with formation of insoluble zinc oxid. The solution may also advantageously contain zinc in the form of a compound which upon evaporation, especially in the presence of a base such as ammonium hydroxid, will yield an insoluble basic salt or salts of zinc. In practice, a compound resulting from reaction between zinc chlorid and ammonium chlorid, probably in the nature of a double chlorid, is found to be highly useful for this purpose and is employed in conjunction with the first mentioned compound in somewhat ammoniacal aqueous solution.

For the purposes of this invention a solution such as that above described has special advantages in that the solution, upon evaporation, yields a mixture of insoluble zinc oxid and oxychlorids, or other basic salts.

In order to explain clearly the principles of the invention, a practical method of carrying it into effect will be described in detail. It is to be borne in mind, however, that this specific example is merely illustrative and that the ingredients, their proportions, and details of procedure, etc., may be varied within fairly wide limits while still realizing the benefits of the invention in some measure.

A strong solution of zinc chlorid containing about 50 per cent. zinc chlorid by weight (approximately 1.55 specific gravity), is prepared in any suitable way, as by dissolving zinc or zinc oxid in dilute hydrochloric acid. For convenience and accuracy in subsequently adding the other reagents it is desirable to have substantially no free hydrochloric acid present in the zinc chlorid solution. If there be an excess of hydrochloric acid present, it may be neutralized by stirring an excess of zinc carbonate into the solution and filtering through mineral wool, the undissolved zinc carbonate coöperating with the mineral wool to provide an efficient filtering bed. This procedure is especially advantageous where the starting materials are relatively impure. In 300 liters of the zinc chlorid solution are dissolved 20 kilos of ammonium chlorid at ordinary temperature, and to the mixture are added gradually and with constant stirring, 350 liters of ammonium hydroxid (28 per cent. $NH_3$), the stirring being best continued until the solution has cooled from the temperature developed in the reaction to about 30° C. During the stirring sufficient water, about 340 liters, is added to make about 1000 liters of the solution at 30° C. Such a solution contains zinc, ammonium, and acid radicals or groups, and from simple calculations based on the data given, it will be seen that the ammonium radical is present in substantial excess over the proportion required to satisfy the acid radical, or the acid radicals where more than one acid is employed. The resultant alkalinity of the solution is such as to give a distinct basic reaction with phenolphthalein, as well as with litmus. This condition is an important characteristic of our fireproofing solution in its most desirable form and it is due to this fact that the zinc is directly deposited as oxid or an oxysalt upon evaporation of the solution.

At 25° C. the solution has a specific gravity of 1.15, and when diluted with four volumes of water it deposits a dense, voluminous, flocculent precipitate of zinc hydroxid and basic zinc chlorids. It contains substantially 10 per cent. of combined metallic zinc. Upon evaporation, the solution deposits the greater part of its zinc content as zinc oxid mixed with variable amounts of basic zinc chlorids or oxychlorids, the proportion of the latter depending largely upon the rapidity of evaporation.

It will be noted that the described solution is relatively concentrated as regards its zinc content, and while said content may vary considerably in practice, it should ordinarily not fall below two or three per cent. by weight, figured as metallic zinc, and higher concentrations, such as that characterizing the above specific example, are better for most purposes.

By reason of its freedom from mucilaginous and gummy constituents, the solution is highly fluid or penetrating in character even when its content of combined zinc is relatively very high.

It is evident that the proportions of the reagents used and the method of mixing them can be varied considerably within the scope of the invention while still realizing its benefits in greater or less degree. The above proportions and mode of procedure have been found especially advantageous practically, however, because the solution thereby obtained has a large zinc content and relatively low ammonium salt content, and at the same time is of such character as to insure deposit of its zinc content in insoluble form within the pores of wood or other material treated therewith. The presence of the ammonium salt enables the solution to hold much more zinc than it could otherwise; but too large an amount of the ammonium salt is undesirable.

The solution, prepared as described, is the finished fireproofing and preserving solution in a particularly desirable form; and it may be applied to wood, fabrics, etc., by dipping, spraying, or any other method which will insure the requisite degree of impregnation. In fireproofing wood, for example, combined vacuum and pressure treatment similar to that used in creosoting wood may be effectively employed. Drying of the treated materials may or may not be hastened by application of heat. If rapid drying is resorted to, it should be carried out in a suitable drying chamber from which any ammonia and ammonium chlorid volatilized in the operation may be led away and recovered in well known ways for reuse.

While we do not desire to be limited to any particular theory regarding the chemical condition of the zinc in the described fireproofing solution, the presence therein of a zincate, such as ammonium orthozincate and possibly metazincate, or compounds resembling these in chemical conduct, is probable. Upon evaporation of the water from wood or other material treated with the solution, the zincates or compounds resembling them break up, depositing insoluble zinc oxid, with production of free ammonia and water. At the same time, varying lesser proportions of insoluble basic chlorids such as $Zn_2OCl_2$, $ZnOHCl$, etc., are deposited in admixture with the zinc oxid.

The advantages attained in the practice of this invention are important. Wood, for example, thoroughly saturated with this solution and dried, retains within its pores a large amount of zinc oxid and some basic zinc chlorids, all of which are water-insoluble and which therefore remain in the wood permanently even though it be exposed to severe weather conditions. The wood is uninflammable, merely charring slowly upon exposure to direct flame. If, in drying, the wood be heated sufficiently to largely drive off ammonium compounds, the insoluble zinc oxid and oxychlorids are substantially the only non-volatile matter left in the wood by the treatment. On the other hand, if the wood is simply air dried, any persisting ammonium compounds constitute in themselves valuable fireproofing agents.

It is to be noted that although, with the aid of our solution, a large percentage of zinc in insoluble form can be deposited in material to be protected, this is done without deleterious effect upon the fiber of the material. If it be attempted to treat wood or other cellulosic material with zinc chlorid solution of a zinc content as high as that of the treating solution described in the foregoing illustrative example, the fibers are thereby weakened, while in addition the residue left in the wood by a zinc chlorid solution is hygroscopic, a disadvantage which is overcome with our solution.

While the chlorids of zinc and ammonium are specified in the example given above, other salts may be used, although for most purposes they offer no advantage over the chlorids and are ordinarily less suitable. It is particularly desirable, however, that whatever acid radical is employed shall be volatilizable upon moderate heating. Thus the sulfate of zinc, though less advantageous, will serve instead of the chlorid; while the bromid, iodid, sulfate, etc., of ammonium may replace sal ammoniac.

What we claim is:

1. As a new article of manufacture, a highly fluid solution for fireproofing and other purposes comprising a zincate, a solvent therefor, and an ammonium salt present in quantity substantially less than is required to saturate the solution, the zinc content of the solution, figured as metallic zinc, being above two per cent. by weight, said solution yielding upon evaporation substantially no non-volatile soluble residue.

2. As a new article of manufacture a solution for fireproofing and other purposes comprising a zincate, a zinc salt, a solvent for both, and an ammonium salt present in quantity substantially less than is required to saturate the solution, the zinc content of the solution, figured as metallic zinc, being above two per cent. by weight, and the solution being alkaline toward phenolphthalein.

3. As a new article of manufacture, a solution for fireproofing and other purposes comprising an equeous solution of an ammonium zincate and an ammonium salt, the solution containing above two per cent. of combined zinc, and the proportion of ammonium salt being substantially less than is required to saturate the solution.

4. A composition for fireproofing and other purposes comprising an aqueous solution containing between about 2 and 10 per cent. of combined zinc, and an amount of an ammonium salt substantially less than is required to saturate the solution, said solution having an alkaline reaction, and yielding upon evaporation substantially no non-volatile soluble residue.

5. A composition for fireproofing and other purposes comprising a highly fluid ammoniacal solution containing not less than about 2 per cent. of combined zinc, and an ammonium salt in quantity much less than sufficient to saturate the solution.

6. A composition for fireproofing and other purposes comprising above two per cent. by weight of combined zinc, an ammonium salt, and an excess of ammonium hydroxid sufficient to render solution alkaline to phenolphthalein, the amount of ammonium salt present being much less than sufficient to saturate the solution.

7. A composition for fireproofing and other purposes comprising an ammoniacal solution containing approximately 10 per cent. of combined zinc.

8. As a new article of manufacture, a solution for fireproofing and other purposes resulting from the interaction, in water, of a zinc salt, an ammonium salt, and ammonium hydroxid, and containing approximately 10 per cent. of combined zinc.

9. As a new article of manufacture, a solution for fireproofing and other purposes resulting from the interaction, in water, of zinc chlorid, ammonium chlorid and ammonium hydroxid, containing about 10 per cent. of combined zinc, and giving an alkaline reaction with phenolphthalein.

10. As a new article of manufacture, an alkaline solution, of combined zinc for fireproofing and other purposes, said solution having a specific gravity of about 1.15 at 25° C. and depositing a voluminous zinc-containing precipitate when diluted with four volumes of water.

11. The method of preparing a solution for fireproofing and other purposes which comprises treating a strong solution of a zinc compound with ammonium hydroxid in slight excess, and then diluting the reaction product to obtain a solution still containing about two per cent. of combined zinc.

12. The method of preparing a solution for fireproofing and other purposes which comprises commingling an ammonium salt and a strong solution of a zinc salt, adding strong ammonium hydroxid with agitation until the solution is alkaline to phenolphthalein, and then diluting the reaction product to obtain a solution still containing above two per cent. of combined zinc.

13. The method of preparing a solution for fireproofing and other purposes which comprises mixing ammonium chlorid with a concentrated zinc chlorid solution and reacting upon the mixture with strong ammonium hydroxid in slight excess, then diluting to obtain a solution containing from about three to ten per cent. of combined zinc.

14. The method of preparing a solution for fireproofing and other purposes which comprises commingling a zinc compound substantially free from foreign matter, an ammonium salt, and ammonium hydroxid, under reacting conditions in the presence of water and in suitable proportions to give a clear solution containing from about three to ten per cent. of zinc combined and having a reaction alkaline to phenolphthalein.

15. The method of preparing a solution for fireproofing and other purposes which comprises commingling zinc chlorid, ammonium chlorid, and ammonium hydroxid, in proportions suitable to give a solution having a specific gravity approximating 1.15 at 25° C.

In testimony whereof we hereunto affix our signatures.

ARTHUR ARENT.
R. A. KUEVER.